US010939722B2

(12) United States Patent
Hansen et al.

(10) Patent No.: US 10,939,722 B2
(45) Date of Patent: Mar. 9, 2021

(54) ARTICLE OF FOOTWEAR AND METHOD FOR FORMING THE ARTICLE

(71) Applicant: ECCO SKO A/S, Bredebro (DK)

(72) Inventors: Hans Chr. Hansen, Løgumkloster (DK); Frank Jensen, Bredebro (DK)

(73) Assignee: ECCO SKO A/S, Bredebro (DK)

(*) Notice: Subject to any disclaimer, the term of this patent is extended or adjusted under 35 U.S.C. 154(b) by 239 days.

(21) Appl. No.: 14/893,916

(22) PCT Filed: May 23, 2014

(86) PCT No.: PCT/EP2014/060692
§ 371 (c)(1),
(2) Date: Nov. 24, 2015

(87) PCT Pub. No.: WO2014/187970
PCT Pub. Date: Nov. 27, 2014

(65) Prior Publication Data
US 2016/0120260 A1    May 5, 2016

(30) Foreign Application Priority Data
May 24, 2013   (DK) .................................. 2013 70281

(51) Int. Cl.
*A43B 5/08*        (2006.01)
*A43B 7/08*        (2006.01)
(Continued)

(52) U.S. Cl.
CPC .................. *A43B 7/08* (2013.01); *A43B 5/08* (2013.01); *A43B 7/087* (2013.01); *A43B 9/02* (2013.01); *B29D 35/061* (2013.01)

(58) Field of Classification Search
CPC .............. A43B 5/08; A43B 7/08; A43B 7/087
(Continued)

(56) References Cited

U.S. PATENT DOCUMENTS 3,383,782 A   5/1968 McGinnity
3,983,204 A   9/1976 Opinsky et al.
(Continued)

FOREIGN PATENT DOCUMENTS

CN   202145947 U   2/2012
GB     2200031 A   7/1988
(Continued)

OTHER PUBLICATIONS

International Search Report and Written Opinion dated Oct. 9, 2014 re: Application No. PCT/EP2014/060692; pp. 1-13; citing: JPH10179205A, U.S. Pat. No. 3,983,204 A, KR101096377B1, JP2005218523A, CN202145947U, US2011005105A1 and GB2200031A.
(Continued)

*Primary Examiner* — Sharon M Prange
(74) *Attorney, Agent, or Firm* — Finnegan, Henderson, Farabow, Garrett & Dunner, LLP (57) ABSTRACT

An article of footwear comprising an upper (2) provided with an inner sole (3) and the upper (2) and inner sole (3) delimiting a cavity (4) for receiving a foot. A first sole (5) covering at least parts of the inner sole (3), said first sole (5) being made in one continuous piece and comprising through-going sole holes (8). The inner sole (3) comprises a mesh directly attached to the upper (2) and comprises a first inner sole surface turning towards the cavity (4) defining the bottom of the cavity. The through-going sole holes (8) are covered at least partly by the mesh and provide a fluid communication between the cavity (4) and the outside of the second sole surface, thereby allowing liquid such as water to run through the sole holes (8) between the cavity (4) and the outside of the footwear.

19 Claims, 9 Drawing Sheets

(51) Int. Cl.
 *B29D 35/06* (2010.01)
 *A43B 9/02* (2006.01)
(58) Field of Classification Search
 USPC .......................................................... 36/8.1
 See application file for complete search history.

(56) References Cited

U.S. PATENT DOCUMENTS

| | | | | |
|---|---|---|---|---|
| 6,701,640 | B2* | 3/2004 | Nakano | A43B 5/08 |
| | | | | 36/3 B |
| 8,776,396 | B2* | 7/2014 | Huynh | A43B 5/08 |
| | | | | 36/11.5 |
| 8,991,075 | B2* | 3/2015 | Chenciner | A43C 1/06 |
| | | | | 36/8.1 |
| 9,756,894 | B2* | 9/2017 | McDowell | A43B 3/00 |
| 2007/0240333 | A1* | 10/2007 | Le | A43B 5/08 |
| | | | | 36/30 R |
| 2011/0005105 | A1 | 1/2011 | Hong | |
| 2011/0167678 | A1 | 7/2011 | Peikert | |
| 2013/0055599 | A1 | 3/2013 | Peikert | |
| 2013/0059116 | A1 | 3/2013 | Peikert | |

FOREIGN PATENT DOCUMENTS

| | | |
|---|---|---|
| JP | 10179205 A | 7/1998 |
| JP | 2005218523 A | 8/2005 |
| KR | 101096377 B1 | 12/2011 |

OTHER PUBLICATIONS

Chinese Office Action for corresponding application 201480039421.3; Report dated Oct. 17, 2016.

* cited by examiner

ARTICLE OF FOOTWEAR AND METHOD FOR FORMING THE ARTICLE

TECHNICAL FIELD

The invention relates to an article of footwear comprising an upper provided with an inner sole, said upper and inner soles delimiting a cavity/space for receiving the foot of a wearer, a first sole comprising a first sole surface and an oppositely placed second sole surface, said first sole surface covering at least parts of the inner sole, said first sole being made in one continuous piece and comprising through-going sole holes.

BACKGROUND

US 2011/0167678 discloses a water-permeable sole unit. It comprises at least one aperture extending through the sole, said aperture being covered with a membrane. The footwear is not suitable for walking in water or at the beach as the shoe does not provide sufficient flow of water in and out of the shoe cavity. Further, the construction of the shoe is quite complicated and requires specific properties of the chosen material in order to ensure a minimum flow of water on one side and on the other side to prevent pebbles or sand from entering the cavity of the shoe, and thereby hurting the feet.

BRIEF SUMMARY

The aspect of the invention is to provide footwear that overcomes at least one of the disadvantages of the prior art or at least to provide a useful alternative.

In accordance with one aspect of the invention there is provided an article of footwear comprising an upper, said article of footwear provided with an inner sole, said upper and inner sole delimiting a cavity/space for receiving the foot of a wearer, a first sole comprising a first sole surface and an oppositely placed second sole surface, said first sole surface covering at least parts of the inner sole, said first sole unit being made in one continuous piece and comprising through-going sole holes, wherein the inner sole comprises a first inner sole surface facing the cavity and defining the bottom of the cavity and an oppositely placed second inner sole surface defining the outer surface of the bottom of the cavity, characterised in that the inner sole comprises a mesh to provide fluid communication from inside the cavity to the outside of the cavity second sole surface where the mesh is directly attached to the upper and in that the mesh covers at least partly the through-going holes in the sole, thereby allowing liquids, such as water, to flow via the holes in the sole from inside the cavity and to the outside of the footwear, and vice versa.

The first sole unit forms the outer sole either partly or completely, e.g. the sole having direct contact to the surface, and it is a sole unit made in one continuous piece in which holes of a certain size are provided. The cross-sectional size of the holes are around ¼-2 cm², preferably 0.5-1.5 cm². The size depends on the size of the shoe. The larger the shoe, the larger the holes. The holes are covered with a mesh placed inside the shoe allowing water to flow in and out between the cavity and outside the footwear. The mesh acts as a barrier against solid particles such as grit, sand and pebbles. As the first sole unit is made in one continuous piece, the sole is quite resistant to all kinds of mechanical forces and influences. The mesh is directly attached to the upper and has two functions: it provides a barrier, and it provides the inner sole in one single unit. This makes the construction of the shoe quite simple but very effective in relation to the purpose of the footwear. It provides an excellent fluid communication allowing water to flow in and out of the cavity on the one hand, and on the other hand it provides a barrier for sand and minor stones which are prevented from running through the mesh. Thereby, the feet of the wearer are prevented from being hurt when walking in areas comprising water mixed with grit, sand and pebbles.

The mesh is preferable a metal mesh. It could be made by other materials. It is just important that it comprises holes.

By fluid communication is to understand that liquid such as water is able to flow through the holes of the first sole, through the channels provided in said first sole and in and out of the cavity.

By mesh is to understand a material comprising holes that are visible and integrated in the design of the mesh. Examples of such a mesh may include a mesh made in polyester, polyamide nylon, other synthetic materials, and metal forming a net. A suitable metal net is for instance a Naomi net from Pentex.

Figure 1A:
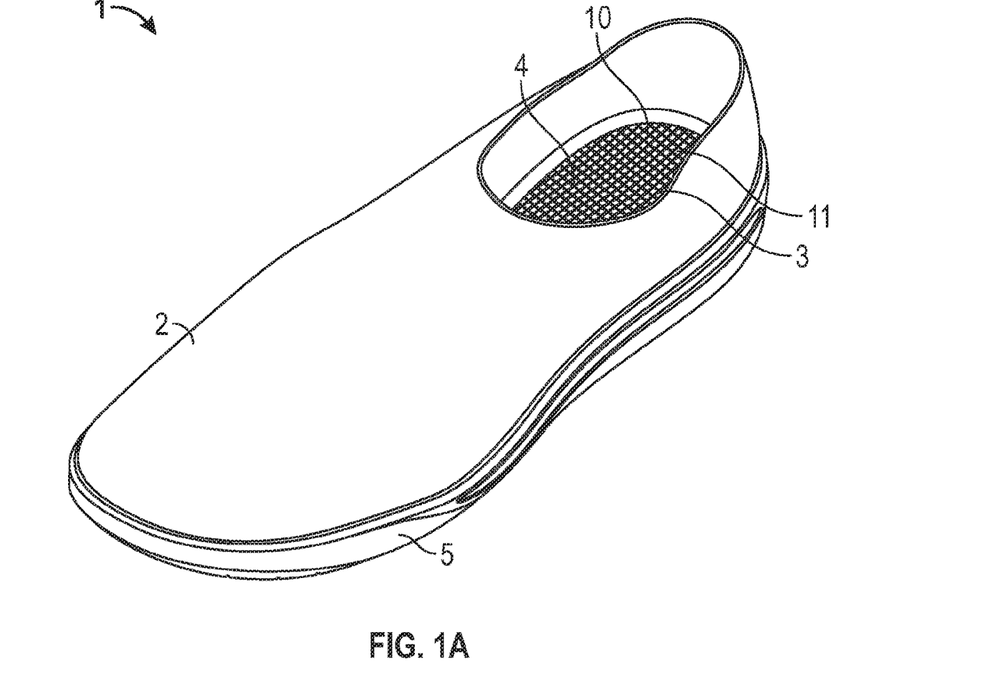
FIG. 1A shows a perspective view of a shoe according to the invention.

By cavity is to understand the space of the footwear, where the foot is placed. The footwear may be a shoe, sandal, bathing shoe or a boot. The inner sole always provides the bottom of the cavity on which the underside of the foot rests, while the upper may be straps for a sandal or textile or skin material for a shoe with a closed upper as it is shown in FIG. 1A.

According to another aspect of the invention, an insert sole part is provided between the inner sole and the first sole, said insert sole part comprising a first insert surface and a second insert surface turning opposite the first insert surface, said first insert surface abutting the second inner surface, and said second insert surface abutting the first sole surface, said insert sole part comprising through-going insert holes being in fluid communicating with the through-going sole holes and the cavity.

Thereby, well-defined channels are provided between the cavity and the outside of the footwear. Furthermore, the insert sole part ensures that it is possible that areas of the mesh are not covered by the polymer injection material during moulding of the first sole. The insert defines areas into which the injected and melted material cannot flow, and thereby the free flow of liquid is obtained in the final shoe.

According to another aspect of the invention, the mesh is placed at least in the area where the insert holes are facing the inner sole.

The cross-sectional area of the holes is ¼-2 cm², preferably 0.5-1.5 cm². By having the complete opening of a hole covered by a mesh, the benefits of the openings are optimised as the whole cross-sectional area of the openings is used.

According to another aspect of the invention, each through-going sole hole is placed in a recess placed at the second sole surface, said recess opening up at the periphery of the first sole, whereby liquid is able to flow out and away from the sole.

Thereby, water running out of the shoe through the through-going holes is able to flow through the recesses and away from the shoe.

According to another aspect of the invention, the entire inner sole comprises a mesh.

Thereby, an optimised area is obtained for liquid to run through. The mesh may be a metal net, a polymer net or a web. It may constitute various materials. However, it is important that the mesh size allows liquid to flow in and out and that the size is small so that pebbles do not enter the cavity when using the footwear. The size of the mesh, through which liquid such as water is flowing, is around $\frac{1}{16}$ mm$^2$-1 mm$^2$, preferably $\frac{1}{4}$-0.5 mm$^2$. Preferably, the mesh is a metal mesh.

According to another aspect of the invention, the insert sole part is formed in a flexible material such as TPU, the insert holes in the flexible part all being encircled by said flexible material.

Advantageously, the insert holes are longitudinal holes having a length 3-5 times the width, whereby the drainage effect is increased and the risk of pebbles entering the holes is reduced. The same applies for the longitudinal sole holes. Advantageously, the insert sole part is a V-shaped device comprising two legs diverging from each other but being attached to each other at the bottom of the V. The bottom of the V is placed in the heel area. They may also be two separate components or they may be oval, round etc.

Preferably, the flexible material is a TPU. This adheres well to the first sole material, which is preferably a PU. This sole material is used when the shoe is produced by direct injection process (DIP). The first sole material may also be a composition of ethylene vinyl acetate (EVA), natural or synthetic rubber, polyurethane (PU) or thermoplastic polyurethane (TPU). This material is used when the shoe is produced by gluing the first sole to the inner sole.

According to another aspect of the invention, each of the through-going insert holes is delimited by a protruding rim placed at the second insert surface.

Thereby, it is ensured that the holes and insert sole parts are properly placed during manufacturing of the footwear. The height of the rim is around 1-3 mm. The size of the rim will, however, depend on the size of the shoe.

According to another aspect of the invention, parts of the first sole are covered with second inserts at the second sole surface in areas outside of where the sole holes are placed.

Thereby, a wear-resistant material may be placed at the outside of the footwear improving the wear properties of the shoe in question. Advantageously, the material is rubber, but may also be natural synthetic rubber, polyurethane (PU), thermoplastic polyurethane (TPU), thermoplastic elastomer (TPE) and latex.

According to another aspect of the invention, the through-going sole holes form first sole channels running from the first sole surface to the second sole surface.

According to another aspect of the invention, the through-going insert holes form insert channels running from the first insert surface to the second insert surface and in extension thereof continue into the first sole channel, whereby liquid such as water is allowed to run through the channels between the cavity and the outside of the footwear.

The channels provide an excellent transportation of liquid.

The invention also relates to a method for forming at least one footwear comprising an upper provided with an inner sole, said upper and inner sole delimiting a cavity for receiving the foot of a wearer, said upper being placed on a last and said inner sole comprising a mesh comprising a first inner sole surface turning towards the cavity/the last and an oppositely placed second inner sole surface, a mould comprising an upper mould part and a lower mould part, said upper mould part comprising at least two parts; a first side frame and a second side frame, said first and second side frames being laterally movable in relation to the lower mould part, said movement taking place between a first and a second position in relation to the lower mould part, said mould comprising at least one mould cavity, and the method comprising the steps:

placing the upper in the mould cavity by moving the last into said mould cavity, moving the side frames towards each other from the first to the second position, whereby the side frames abut the upper, said lower mould part comprising a number of protruding parts for providing through-going sole holes in a first sole formed by the mould, said protruding parts comprising a cross-sectional area being substantially equal to the cross-section area of the sole holes, moving the lower mould part towards the upper from a third to a fourth position, said lower mould part being vertically movable in relation to the upper mould part between the third and the fourth position, injecting a composition into a space between the upper and the lower mould part, whereby the first sole is formed and whereby the first sole adheres to a part of the second sole surface of the inner sole, and whereby through-going sole holes are provided in the area where the protruding parts are present.

The invention also relates to a method placing an insert sole part in the mould, said insert sole part comprising a first insert surface and a second insert surface turning opposite the first insert surface, said second insert surface abutting the lower mould part, said protruding parts covering through-going insert holes placed in the insert sole part, moving the lower mould part towards the upper from the third to the fourth position, in said fourth position the first insert surface abuts the second inner sole surface, injecting a composition into a space between the upper and the lower mould part, whereby a first sole is formed and whereby the first sole connects to the upper and covers the insert sole part outside the insert holes of the insert sole part.

By using the insert sole part, it is possible to produce the footwear by direct injection moulding. The insert sole part ensures that the holes in the first sole are provided when the first sole is produced by a direct injection process. If the first sole is produced in a separate process and afterwards attached to the upper and the inner sole by gluing, the insert sole part is actually superfluous.

The invention also relates to a method where one or several second insert(s) is/are placed in the mould in the lower mould part outside the area where the protruding parts of the lower mould part are placed, said second inserts adhering to the second sole surface of the first sole when the moulding of said first sole takes place.

BRIEF DESCRIPTION OF THE DRAWING(S)

The invention is explained in detail below with reference to the drawing(s), in which.

DETAILED DESCRIPTION

FIG. 1A shows the footwear 1 according to the invention. It comprises an upper 2 and an inner sole 3 attached to the upper 2 by gluing, sewing or similar. The inner sole 3 is a mesh comprising a grit with the size of ⅟₁₆ mm²-1 mm², preferably ¼-0.5 mm². The grit/inner sole 3 and the upper 2 provide a cavity 4, where a foot of a wearer is placed, said foot resting against the bottom 11 of the cavity 4. The inner sole 3 comprises a first inner sole surface 10 pointing towards the cavity 4 and an oppositely placed second inner sole surface. A first sole 5 is provided at the second inner sole surface and provides the outsole of the shoe partly or completely, i.e. the part of the shoe being in contact with the ground when walking.

Figure 1B:
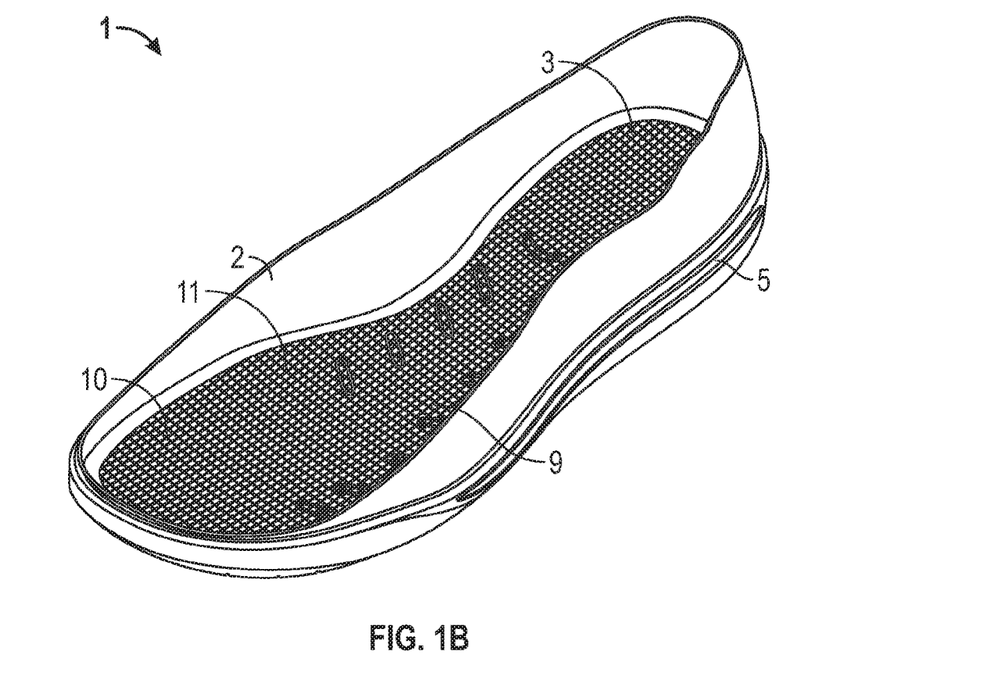
FIG. 1B shows the shoe in FIG. 1A, but where parts of the upper is removed for a better view of the inner sole according to the invention.

FIG. 1B shows the footwear 1 of FIG. 1A, where the upper 2 has been partly removed, whereby the bottom 11 and the cavity 4 are exposed. The whole bottom 11 comprises a mesh 9 providing the inner sole 3. However, the mesh may be just a part of the bottom.

Figure 1C:
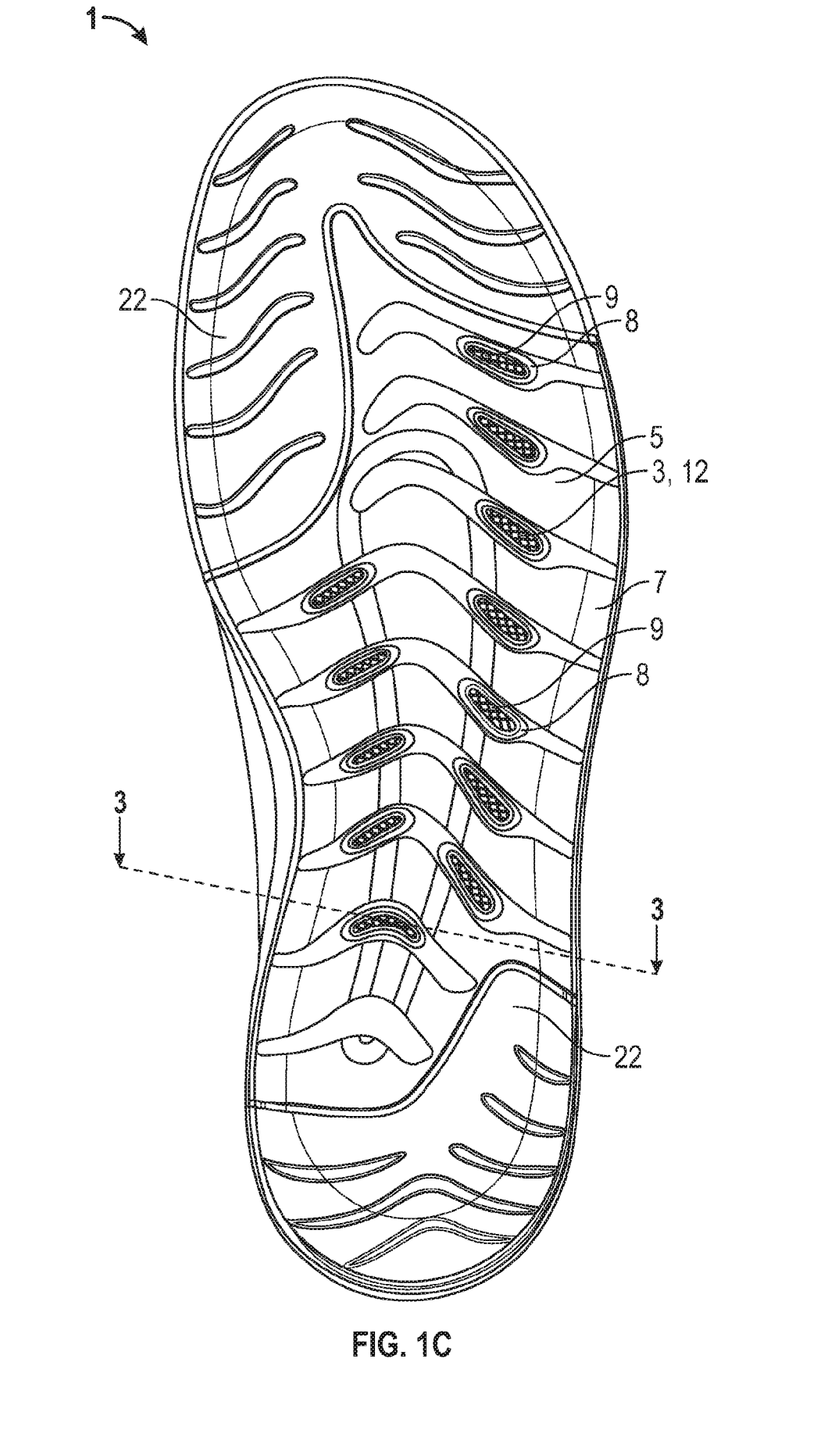
FIG. 1C shows a bottom view of the shoe in FIG. 1A.

FIG. 1C shows a view of the outside bottom of the footwear 1 showing the first sole 5. The first sole 5 comprises a second sole surface 7, said surface being in contact with the ground. The first sole 5 may be covered in part by second inserts 22 which provide a more wear and slip-resistant surface in the areas towards which these are faced. A second insert 22 is made in a material such as rubber, polyurethane, thermoplastic polyurethane or thermoplastic elastomer. In the figure, a second insert 22 is placed in the heel and toe-region, while the outer surface there between is provided by the first sole 5 and the material of said first sole 5. Advantageously, the first sole 5 is made of polyurethane. The first sole 5 comprises openings. The openings are through-going sole holes 8 allowing a fluid communication between the cavity 4 and the outside bottom of the footwear. The through-going sole holes 8 are covered with the inner sole 3 formed as a mesh 9 at the side opposite the second sole surface 7. The second inner sole surface 12 is visible through the openings 8. They may be covered by direct contact with the first sole, or an insert sole part may be incorporated which will be explained below.

Figure 2:
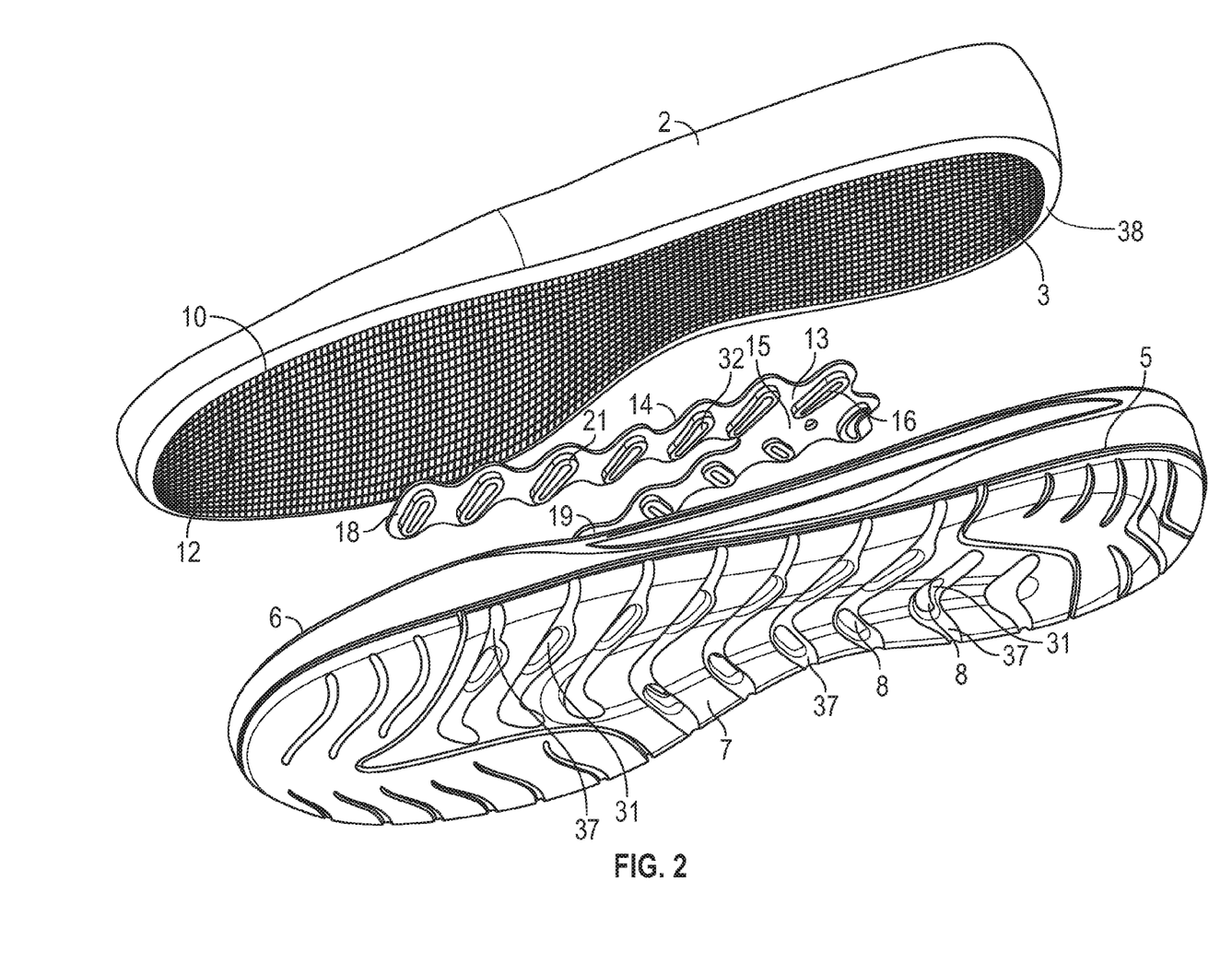
FIG. 2 shows an exploded view of the shoe shown in FIG. 1B showing different components of the shoe according to the invention.

FIG. 2 shows an exploded view of a shoe according to the invention comprising the upper 2 to which the inner sole 3 is attached. In this example, the whole area of the inner sole 3 is made in a mesh. The inner sole comprises the first inner sole surface 10 and an oppositely placed second inner sole 12. Further, the figure shows the first sole 5. The first sole 5 comprises a first sole surface 6 (facing the second inner sole surface 12) and the oppositely placed second sole surface 7. Through-going sole holes 8 are provided in the first sole 5 as explained above. The holes 8 are arranged in a specific pattern corresponding to holes placed in an insert sole part 13. The insert sole part 13 is placed between the first sole 5 and the inner sole 3.

The insert sole part 13 is a V-shaped flexible member comprising a first insert sole surface 14 and a second insert surface 15. The first insert sole surface 14 faces the second inner sole surface 12 and is in close contact with said surface. The second insert sole surface 15 faces the first sole surface 6 also being in close contact with said surface. The insert 13 is embedded in the first sole material at the encircling edges. The V-shaped insert comprises a first leg 18 comprising 6-8 through-going insert holes 16 and a second leg 19 also comprising through-going insert holes 16; in this example 4-6 insert holes. The flexible insert part 13 may have several other shapes. However, making the insert V-shaped gives a better adherence to the first sole material, when it is injected into the mould form when forming a shoe according to the invention which will be explained below. The through-going insert holes 16 provide insert channels 32 which are arranged in fluid communication with the first sole channels 31, when the shoe is assembled. The perimeter shape of the channels in the first sole and the perimeter shape of the insert channels are substantially identical. The insert holes 16 are ¼-2 cm² preferably 0.5-1.5 cm² in cross-sectional area and have a longitudinal form. The holes 16 are delimited by a protruding rim 21 placed around the hole at the entrance of the hole and delimiting it. The rims 21 have a height of 1-3 mm and are arranged at the second insert surface 15. The outer radially pointing surfaces of the rims 21 abut the interior of the first sole channels 31 when the shoe is finally formed.

Recesses 37 placed across the second sole surface connect the sole holes 8 placed opposite each other. The recesses 37 open up at the periphery of the first sole 5, whereby liquid is able to flow out and away from the sole 5.

Figure 3:
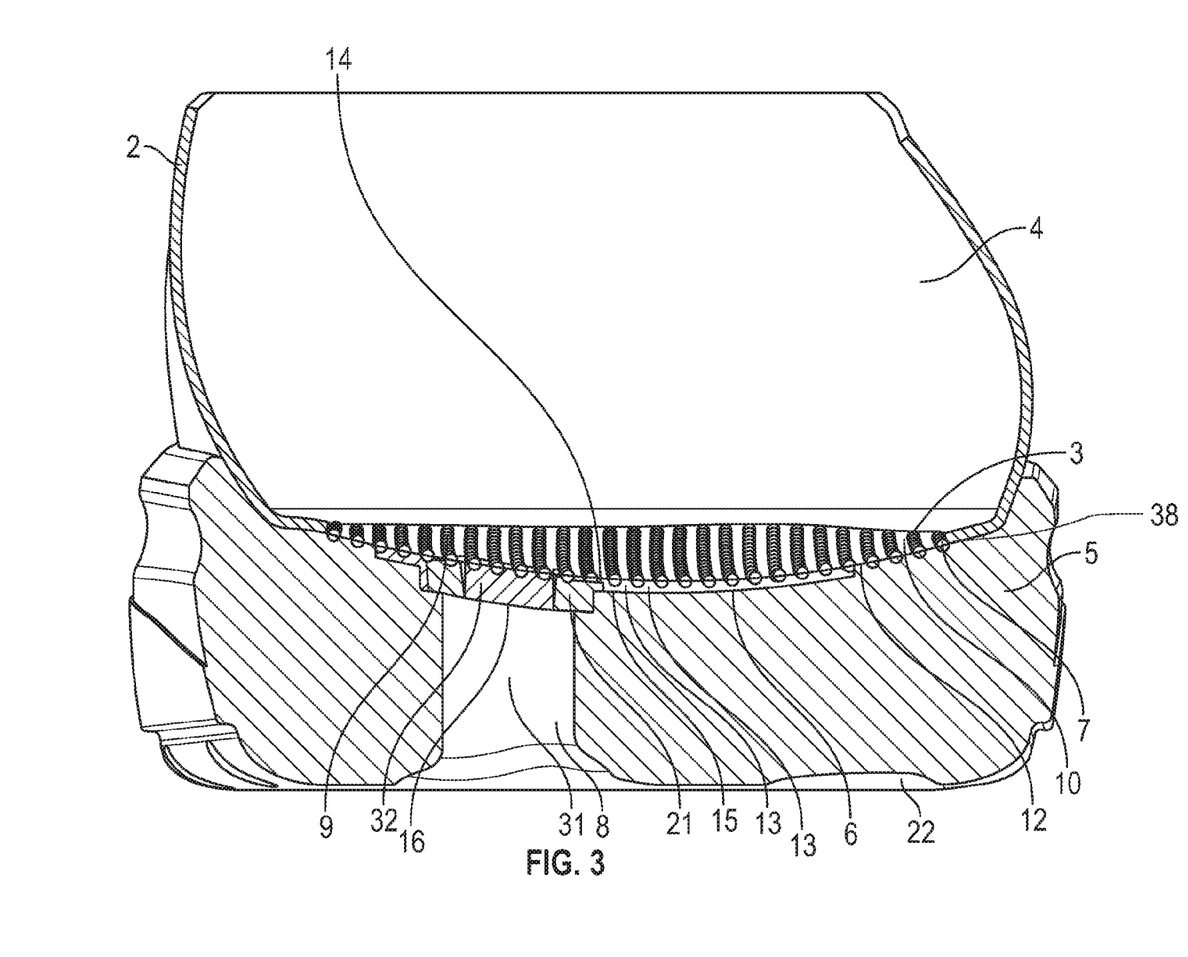
FIG. 3 shows a cross-sectional view along the line 3-3 in FIG. 1C.

FIG. 3 shows a cross-sectional view along the line III in FIG. 1C. The inner sole 3 comprising the mesh 9 is distorted. The figure shows the relation between the various layers of the footwear. The first sole 5 comprises the first sole surface 6 being in contact with the second insert surface 15 of the insert sole part 13 and the second sole surface 7 of the inner sole 3. The insert sole part 13 is placed between the inner sole 3 and the first sole 5. The insert sole part 13 comprises the through-going insert holes 16 providing the channels. The protruding rim 21 is embraced by the first sole 5 at the radial side of the rims 21. The first sole channel 31 is placed in direct extension of the insert channel 32. The second sole surface 7 is partly covered with a second insert 22.

Figure 4:
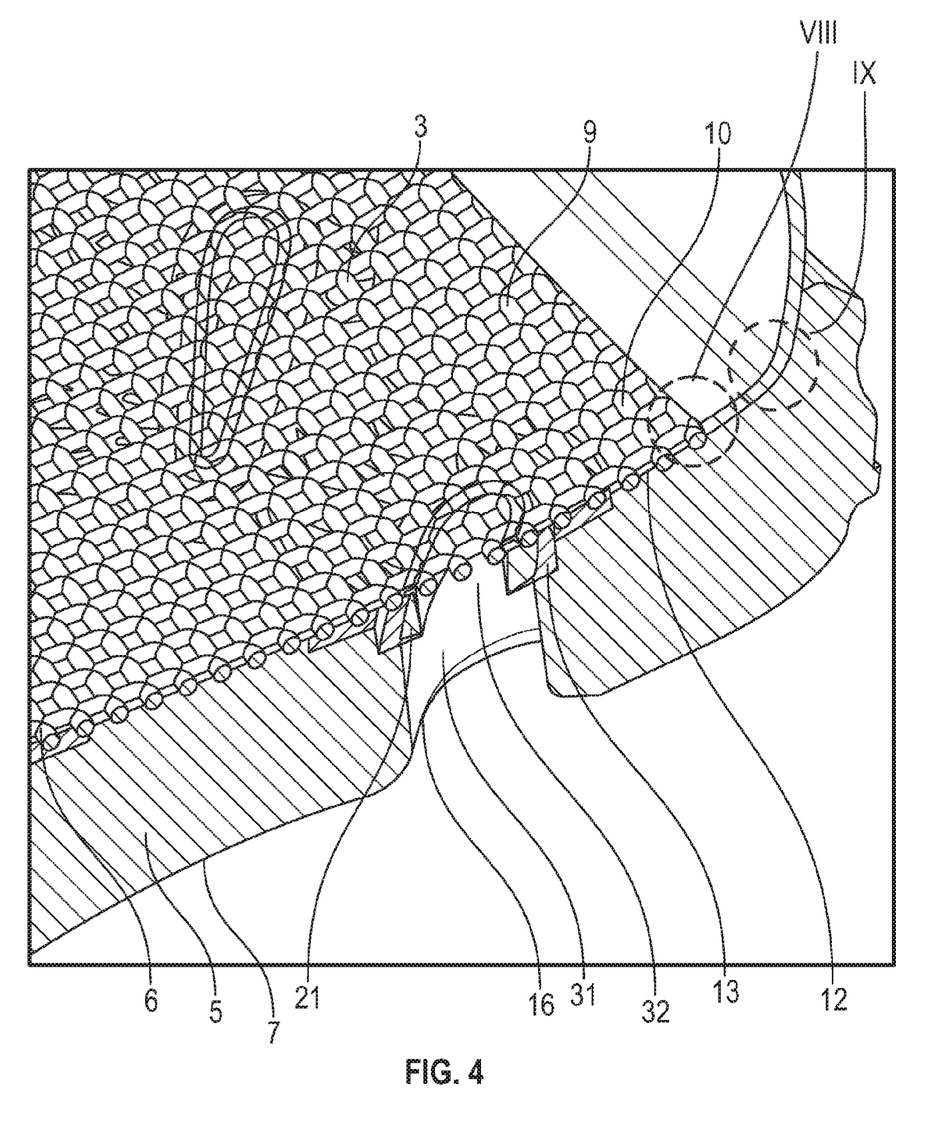
FIG. 4 shows a detailed view of channels for transporting liquid.

FIG. 4 shows a detailed view of one fluid channel comprising the first channel 31 and the insert channel 32. The channels provide fluid connection between the cavity 4 of the shoe and the outside bottom of the shoe sole. The mesh 9 covers the aperture of the channels and provides a sort of strainer preventing grit, pebbles and other small particles from entering the cavity of the footwear.

In the areas marked with VIII and IX, the inner sole 3 may be attached to a proximal part 38 of the upper 2, where the attaching of the inner sole is shown in more detail in FIG. 8A-E and FIG. 9A-E.

Figure 5:
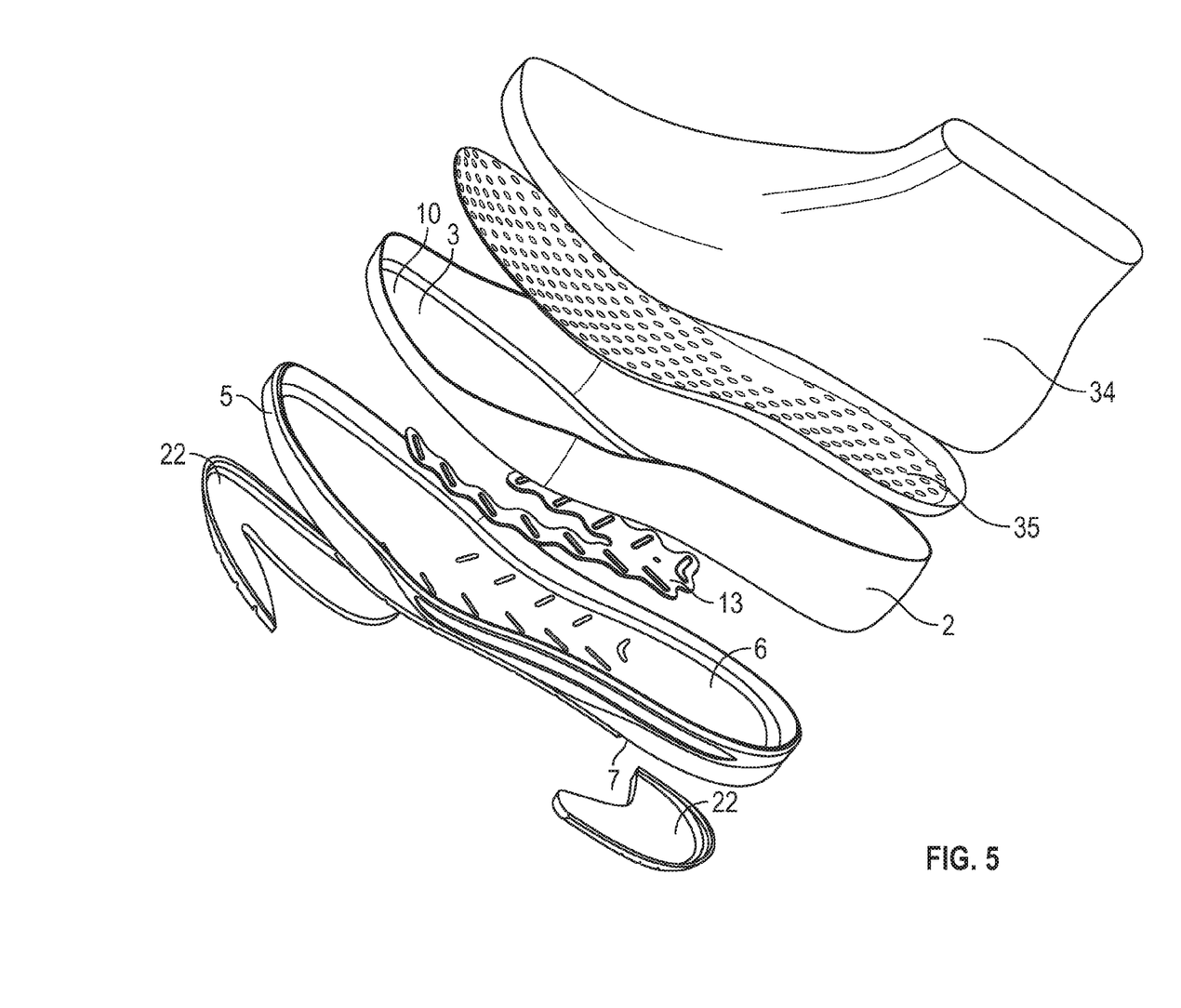
FIG. 5 shows an exploded view of an article of footwear according to the invention and the relation to an insole and a shank.

FIG. 5 shows an exploded view of an article of footwear according to the invention. Further, an insole 35 is shown which may be placed in the cavity 4 covering the first inner sole surface 10. Further, it discloses the sole comprising outsole elements shaped as a second insert 22; one placed in the heel area and one placed in the toe area of the second sole surface 5, and there between the second sole material is exposed. Between the first sole 5 and the inner sole 3, the insert sole part 13 is placed, said opening in the insert sole part 13 being placed in extension of the holes of the first sole 5. Further, the figure shows the relation to a foot 34 (or a last).

Figure 6:
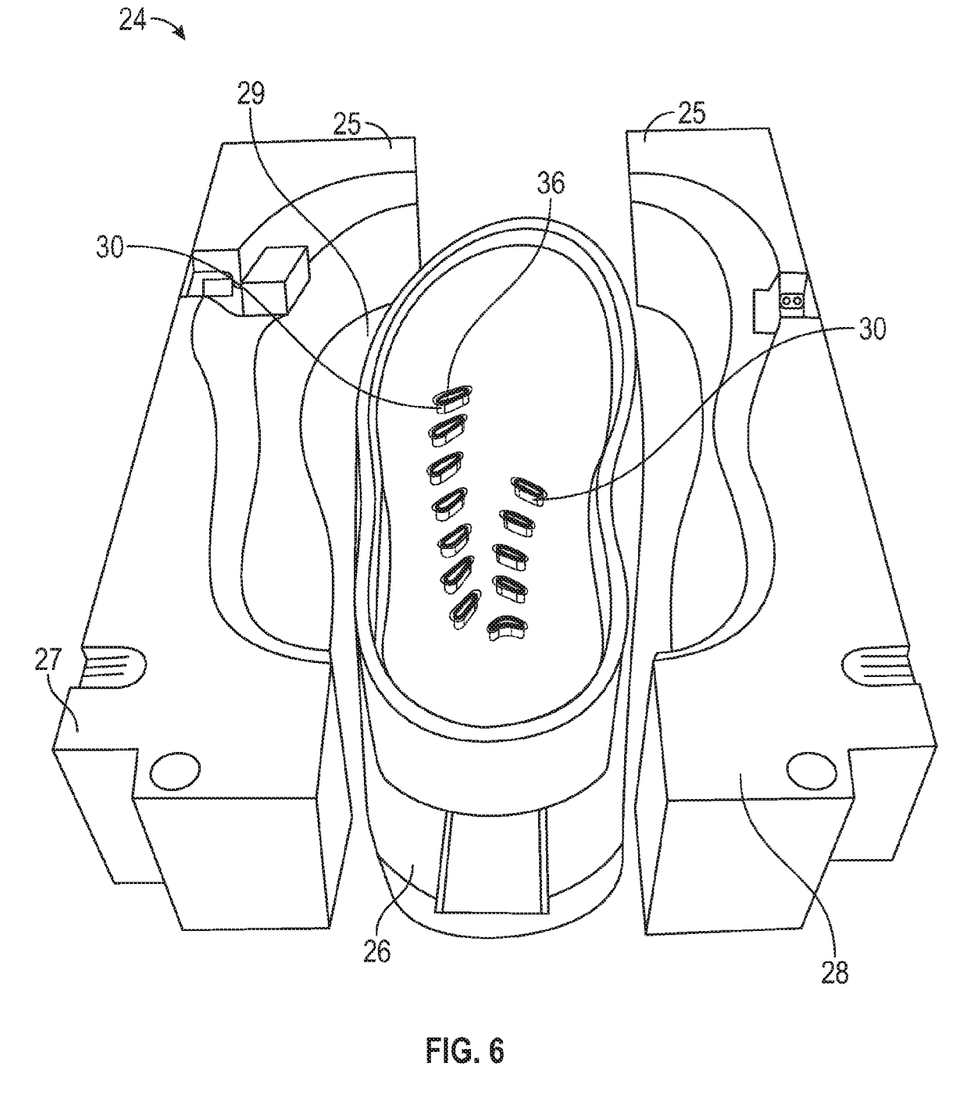
FIG. 6 shows a principle view of a mould for forming footwear according to the invention.

FIG. 6 shows a mould 24 for providing a shoe according to the invention. The mould 24 comprises an upper mould part 25 and a lower mould part 26. The upper mould part 25 comprises at least two parts; a first side frame 27 and a second side frame 28. The two frames are laterally movable in relation to each other and in relation to the lower mould part 26. The movement takes place between a first and a second position. Said second position is when the two mould parts 27, 28 abut a last with an upper. The upper is placed in a cavity 29 provided by the mould part by moving the last into the cavity 29. Then, the two side frames 27, 28 are moved from the first to the second position, whereby the side frames 27, 28 abut the uppers.

The lower mould part 26 comprises a number of protruding parts 30 for providing through-going holes. The top of the parts 30 comprises a top surface 36 being substantially equal to the cross-sectional area of the sole holes. The lower mould part 26 is moved towards the upper 25 from a third to a fourth position, and the injection material is injected into the space between the upper 25 and lower mould part 26, whereby the first sole is formed and connects to the upper. The first sole material also connects to the inner sole. Through-going sole holes are provided in the area, where the protruding parts 30 are present.

Before the injection material is injected, the insert sole part 13 is placed as explained above at the protruding parts 30, said protruding parts 30 covering the insert holes 16 placed in the insert sole part 13. Then, the lower mould part 26 is moved from a third to a fourth position, and the composition for forming the first sole 5 is injected. The first sole material adheres to the upper and to the inner sole 3 and further covers the insert sole part 13 in the areas, where it is not protected by the protruding parts 30.

Before injecting the composition for moulding the first sole, the second insert part 22 may be placed in the lower mould form 26 in order to provide areas of the outsole with other properties than is the case with the first sole material. The mould is used when the soles are formed by direct injection. However, if the first sole is formed in a separate process and glued to the underside of the inner sole formed in a mesh, the insert sole part may be superfluous.

Figure 7:
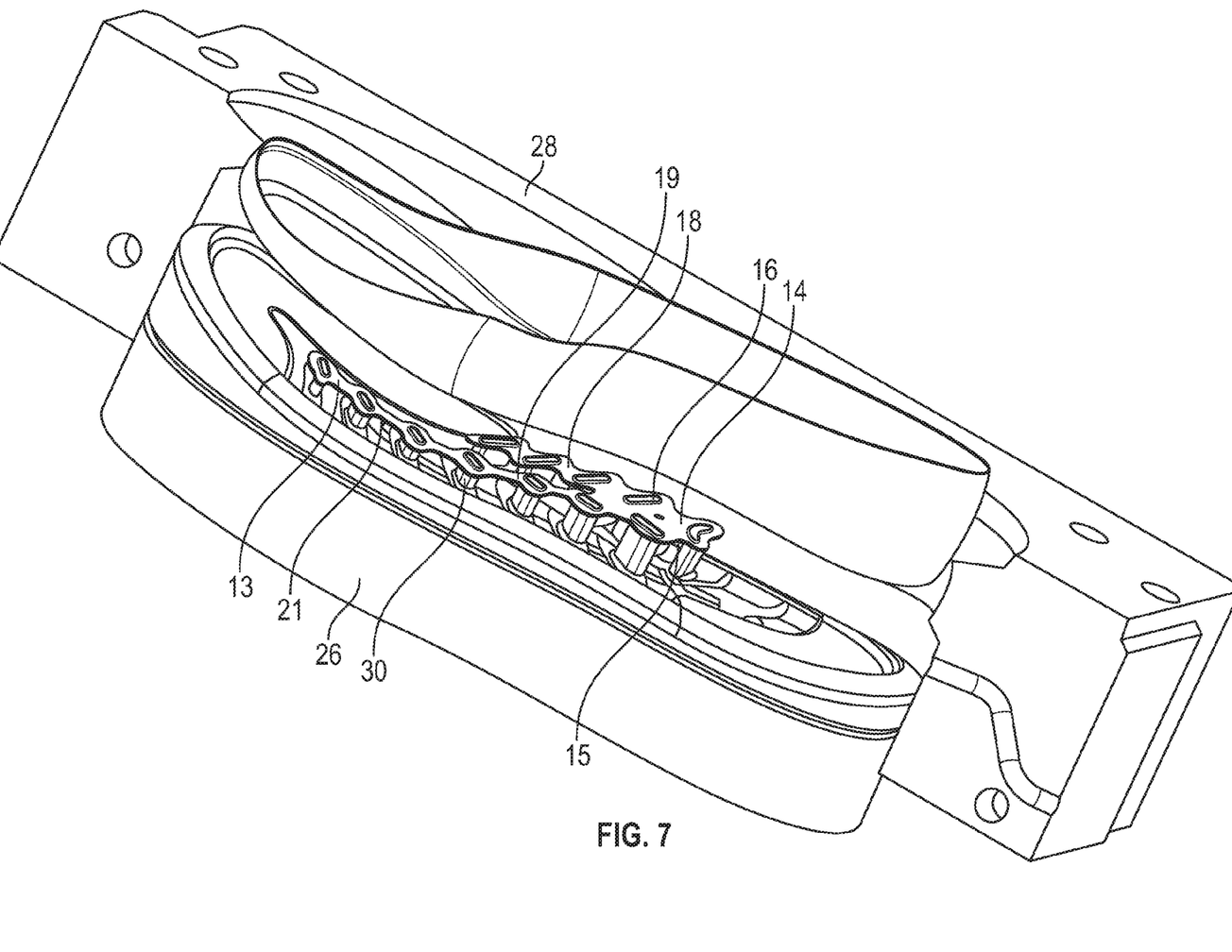
FIG. 7 shows a part of the mould for forming footwear according to the invention and the relation between the mould and the various parts of such a shoe.

FIG. 7 shows a part of the mould in FIG. 6 and its relation to the insert sole part 13. The insert sole part 13 is manufactured in a separate process. Afterwards, the insert part 13 is placed on the protruding parts 30 in such a way that the protruding rims 21 surround the top surface 36 of the parts 30 and a part (2-3 mm) of the upper part of the outer surface of the parts 30.

FIG. 8A-E shows the inner sole 3, which may be in the form of a mesh 9, where the mesh may be provided with a binding edge 39 which may be attached to a peripheral area of the mesh 9 or the inner sole 3. The binding edge 39 may be any form for edge that allows attachment to an upper, where in this embodiment the binding edge 39 is in the form of an elongated strip 40, having a longitudinal central axis along the length of the strip, where the strip may be folded in half along the longitudinal axis 41 and where a first edge 42 is positioned on the upper side 6 of the inner sole 3, and an opposing edge 43 is positioned on the opposite lower side 7 of the inner sole 3, so that the inner sole is sandwiched in between the first edge 42 and the second edge 43 of the strip. This kind of strip is shown in all the FIGS. 8A-8E.

Figures 8A, 8B:
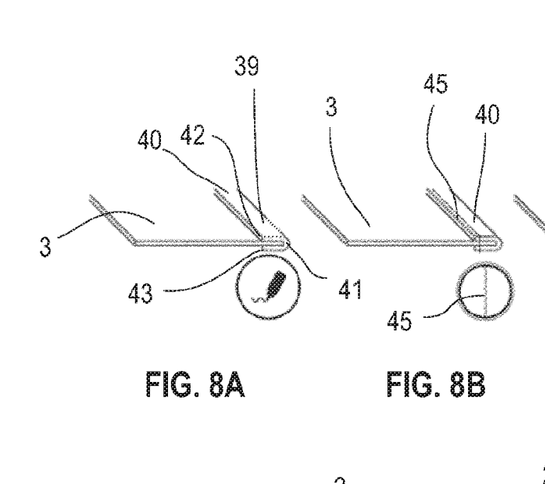
FIGS. 8A-8E show an inner sole provided with a binding edge according to the invention.

In one embodiment, shown in FIG. 8A, the binding edge 39 may be glued to the inner sole 3, by positioning an adhesive in the area between the inner sole 3 and the folded edges 42, 43, i.e. as layers in a sandwiched structure.

In one embodiment, shown in FIG. 8B, the binding edge 39 may be attached to the inner sole 3 by introducing a lapped seam 45, that extends in a direction that is parallel to the longitudinal axis of the strip 40, so that the edges 42,43 of the strip are attached securely to the inner sole 3.

Figure 8C:
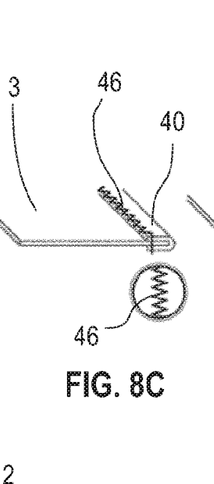

In one embodiment, shown in FIG. 8C, the binding edge 39 may be attached to the inner sole 3 by introducing a zig zag seam 46, that extends in a direction that is parallel to the longitudinal axis of the strip 40, so that the edges 42,43 of the strip are attached securely to the inner sole 3.

Figure 8D:
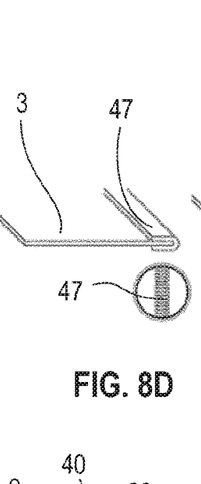

In one embodiment, shown in FIG. 8D, the binding edge 39 may be attached to the inner sole 3 by introducing a flat lock seam 47, that extends in a direction that is parallel to the longitudinal axis of the strip 40, so that the edges 42,43 of the strip are attached securely to the inner sole 3.

Figure 8E:
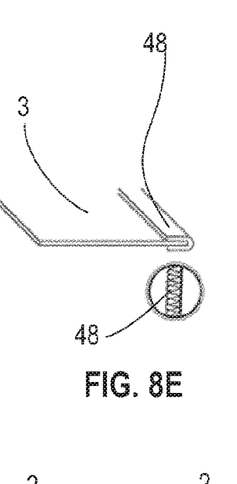

In one embodiment, shown in FIG. 8E, the binding edge 39 may be attached to the inner sole 3 by introducing an over lock/strobe seam 48, that extends in a direction that is parallel to the longitudinal axis of the strip 40, so that the edges 42,43 of the strip are attached securely to the inner sole 3.

The binding edge 39 may especially be utilised when the abutting part of the inner sole 3 is a mesh 9, as a periphery of a mesh may have a low constructional integrity, and the threads might fall from each other if the mesh is attached to the upper without a reinforcing edge (binding edge) 39. In other embodiments, the mesh may be in the form where the mesh may be directly attached to the upper, without providing a reinforcement edge 39, in case the mechanical integrity of the mesh is high enough to be capable of tolerating the direct attachment.

The inner sole 3 may be formed of a mesh 9, where the inner sole may be composed of a mesh, or the inner sole may be a sole that is partially a mesh and partially a woven/non-woven material, a fabric, or any material suited for making an inner sole and may be attached to the mesh 9. Thus, it may not be necessary to provide the entire inner sole in the form of a mesh, but where the inner sole at least partly comprises a mesh 9 and where the mesh may be directly attached to the upper. Thus, it may be foreseen that the mesh part of the inner sole may only be provided in a front end, middle part, side parts, and/or back end of the footwear, or any combination thereof as the mesh may only need to be in areas where the outsole is provided with through going openings 8, as shown in the previous figures.

FIG. 9A-E shows how the inner sole of FIG. 8A-8E, having a binding edge 39 which may be attached to a distal proximal part 38 of an upper 2.

Figure 9A:
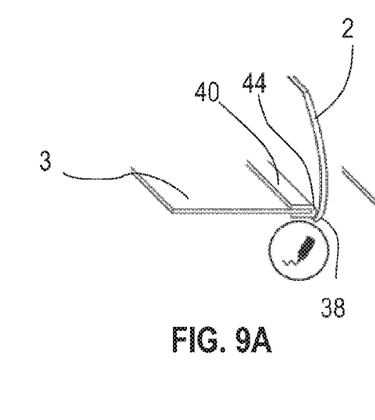
FIGS. 9A-9E show how the inner sole of FIGS. 8A-8E may be attached to an upper according to the invention.

In one embodiment, shown in FIG. 9A, the proximal end 38 of the upper 2, may be attached to the binding edge 38 where an adhesive is arranged between the proximal end and the inner sole and/or the binding edge. The glue may be provided along the periphery of the inner sole, so that the inner sole is attached to the upper along the proximal end 38 of the upper 2, as may be seen I FIG. 2, so that the inner sole creates a cavity 4 for receiving the foot.

Figure 9B:
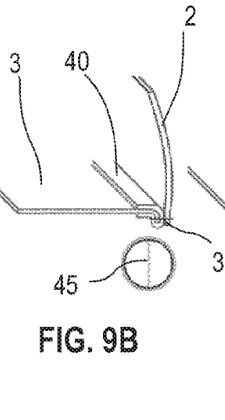

In one embodiment, shown in FIG. 9B, the proximal end 38 of the upper 2, may be attached to the binding edge 39 where the proximal end may be sewn using an open or lapped seam to the binding edge. The sewing may be provided along the periphery of the inner sole, so that the inner sole is attached to the upper along the proximal end 38 of the upper 2, as may be seen I FIG. 2, so that the inner sole creates a cavity 4 for receiving the foot. The fold 41 along the longitudinal axis of the binding edge 39 may be bent downwards, so that the stitching may secure the proximal end 38 in a manner where the layer of the upper is substantially parallel to the folded portion, creating a layered structure of the binding edge 39 and the proximal end 38 of the upper 2

Figure 9C:
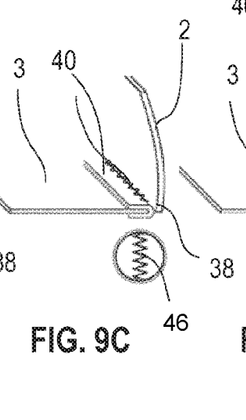
Figure 9D:
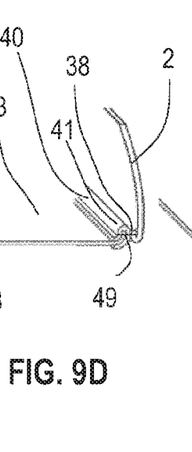

In one embodiment, shown in FIG. 9C, the proximal end 38 of the upper 2, may be attached to the binding edge 38 where the proximal end may be sewn using an zig zag seam to the binding edge In one embodiment, shown in FIG. 9D, the proximal end 38 of the upper 2, may be attached to the binding edge 38 where the proximal end may be sewn using a blinded seam, where the fold 41 on the binding edge 41 may be folded upwards and the proximal end 38 of the upper 2 may be also be folded, so that when the upper is in its correct position, creating a cavity, the seam is not accessible from the outside of the cavity, and is completely within the cavity.

Figure 9E:
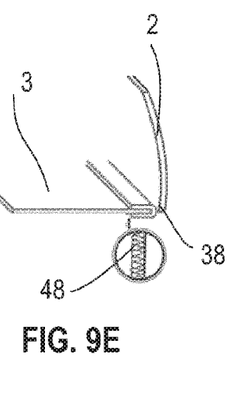

In one embodiment, shown in FIG. 9E, the proximal end 38 of the upper 2, may be attached to the binding edge 38 where the proximal end may be sewn using an over lock/strobe seam.

The sewing shown in FIG. 9B-E may be provided along the periphery of the inner sole, so that the inner sole is attached to the upper along the proximal end 38 of the upper 2, as may be seen I FIG. 2, so that the inner sole creates a cavity 4 for receiving the foot.

Furthermore, all the attachment methods shown in FIGS. 8 and 9 may be combined in any manner in order to obtain an inner sole that is securely attached to an upper.

The invention claimed is:

1. An article of footwear comprising:
an upper;
an inner sole, the upper and the inner sole defining a cavity configured to receive the foot of a wearer, wherein the inner sole is proximate the cavity and comprises:
a first inner sole surface facing the cavity and defining the bottom of the cavity, and
an oppositely placed second inner sole surface defining the outer surface of the bottom of the cavity; and
a first sole comprising:
a first sole surface and an oppositely placed second sole surface, the first sole surface being disposed proximate at least a portion of the second inner sole surface,
wherein the first sole is made in one continuous piece and comprises through-going sole holes,
wherein the inner sole comprises a mesh configured to provide fluid communication from inside the cavity to the outside of the second sole surface, a peripheral boundary of the mesh being directly attached to a lower edge of the upper at a location where the lower edge of the upper contacts a portion of the first sole, wherein the mesh at least partially covers the sole holes of the first sole and is configured to allow liquids to flow via the sole holes between the cavity and the outside of the footwear, and
wherein an insert sole part is provided between the inner sole and the first sole, the insert sole part having through-going insert holes providing insert channels in fluid communication with the cavity, wherein the insert sole part comprises a protruding part extending in a direction away from the second inner sole surface, at least one of the insert holes of the insert sole part extending through the protruding part, wherein the protruding part comprises a protruding rim extending into a material volume of the first sole.

2. An article of footwear according to claim 1, wherein the insert sole part comprises a first insert surface and a second insert surface opposite from the first insert surface, the first insert surface abutting the second inner sole surface and the second insert surface abutting the first sole surface, and
the insert holes of the insert sole part are in fluid communication with the sole holes of the first sole and with the cavity.

3. An article of footwear according to claim 1, wherein each sole hole of the first sole is placed in a recess placed at the second sole surface, the recess opening up at the periphery of the first sole, whereby liquid is able to flow out and away from the first sole.

4. An article of footwear according to claim 1, wherein the entire inner sole comprises a mesh.

5. An article of footwear according to claim 2, wherein the insert sole part is formed in a flexible material, the insert holes of the insert sole part being encircled by the flexible material.

6. An article of footwear according to claim 2, wherein each of the insert holes of the insert sole part is delimited by the protruding rim of the protruding part, the protruding rim being placed at the second insert surface.

7. An article of footwear according to claim 1, wherein parts of the first sole are covered with inserts at the second sole surface in areas outside of where the sole holes of the first sole are placed.

8. An article of footwear according to claim 1, wherein the sole holes of the first sole form sole channels running from the first sole surface to the second sole surface.

9. An article of footwear according to claim 2, wherein
the sole holes of the first sole form sole channels running from the first sole surface to the second sole surface, and
the insert holes of the insert sole part form the insert channels running from the first insert surface to the second insert surface and in extension thereof continuing into the sole channels, whereby liquid is allowed to run through the sole channels between the cavity and the outside of the footwear.

10. An article of footwear according to claim 1, wherein the protruding part provides a side wall for at least one insert channel.

11. An article of footwear according to claim 1, wherein the protruding part extends fully around at least one insert channel.

12. An article of footwear according to claim 1, wherein the protruding part abuts the first sole surface.

13. An article of footwear according to claim 1, wherein the insert sole part provides a seal between the first sole material and the second inner sole surface, the seal being configured to prevent the first sole material from flowing into the sole holes of the first sole or the insert holes of the insert sole part.

14. An article of footwear according to claim 1, wherein the article of footwear comprises a second insert disposed on the second sole surface.

15. An article of footwear according to claim 1, wherein at least one insert channel is in fluid communication with at least one of the sole holes of the first sole.

16. An article of footwear according to claim 1, wherein at least one insert channel is coaxial or overlaps with at least one of the sole holes of the first sole.

17. An article of footwear according to claim 1, wherein the lower edge of the upper is formed in an outer-most portion of the upper.

18. An article of footwear according to claim 1, wherein the first inner sole surface is configured to contact the foot of the wearer when the foot of the wearer is received within the cavity.

19. An article of footwear comprising:
an upper;
an inner sole, the upper and the inner sole defining a cavity configured to receive the foot of a wearer, wherein the inner sole is proximate the cavity and comprises:
  a first inner sole surface facing the cavity and defining the bottom of the cavity, and
  an oppositely placed second inner sole surface defining the outer surface of the bottom of the cavity; and
a first sole comprising:
  a first sole surface and an oppositely placed second sole surface, the first sole surface being disposed proximate at least a portion of the second inner sole surface,
  wherein the first sole is made in one continuous piece and comprises through-going sole holes,
wherein the inner sole comprises a mesh configured to provide fluid communication from inside the cavity to the outside of the second sole surface, wherein the mesh at least partially covers the sole holes of the first sole and is configured to allow liquids to flow via the sole holes between the cavity and the outside of the footwear, and
wherein an insert sole part is provided between the inner sole and the first sole, the insert sole part being configured in a V-shape and having:
  a first leg and a second leg diverging from each other to form the V-shape of the insert sole part, and
  a plurality of through-going insert holes formed in at least one of the first leg or second leg, the insert holes providing insert channels in fluid communication with the cavity, wherein the insert sole part comprises a protruding part extending in a direction away from the second inner sole surface, at least one of the insert holes of the insert sole part extending through the protruding part, wherein the protruding part comprises a protruding rim extending into a material volume of the first sole.

* * * * *

UNITED STATES PATENT AND TRADEMARK OFFICE
CERTIFICATE OF CORRECTION

PATENT NO. : 10,939,722 B2
APPLICATION NO. : 14/893916
DATED : March 9, 2021
INVENTOR(S) : Hans Chr. Hansen et al.

It is certified that error appears in the above-identified patent and that said Letters Patent is hereby corrected as shown below:

On the Title Page

Item (30), under "Foreign Application Priority Data," "2013 70281" should read --PA 2013 70281--.

Signed and Sealed this
Thirtieth Day of January, 2024

Katherine Kelly Vidal
*Director of the United States Patent and Trademark Office*